(12) United States Patent
Pekin

(10) Patent No.: US 8,474,331 B2
(45) Date of Patent: Jul. 2, 2013

(54) FORCE MEASUREMENT SYSTEM

(76) Inventor: David Pekin, San Diego, CA (US)

( * ) Notice: Subject to any disclaimer, the term of this patent is extended or adjusted under 35 U.S.C. 154(b) by 178 days.

(21) Appl. No.: 12/835,520

(22) Filed: Jul. 13, 2010

(65) Prior Publication Data

US 2011/0162465 A1 Jul. 7, 2011

Related U.S. Application Data

(63) Continuation-in-part of application No. 12/559,700, filed on Sep. 15, 2009, which is a continuation-in-part of application No. 12/052,733, filed on Mar. 21, 2008, now Pat. No. 7,861,454, which is a continuation-in-part of application No. 11/977,714, filed on Oct. 24, 2007, now Pat. No. 7,779,573, which is a continuation-in-part of application No. 11/307,840, filed on Feb. 24, 2006, now Pat. No. 7,318,295.

(60) Provisional application No. 61/292,104, filed on Jan. 4, 2010.

(51) Int. Cl.
*G01L 1/22* (2006.01)

(52) U.S. Cl.
USPC ................ 73/862.474; 73/862.471

(58) Field of Classification Search
USPC ........ 73/862.392, 862.471, 862.474
See application file for complete search history.

(56) References Cited

U.S. PATENT DOCUMENTS

| | | | |
|---|---|---|---|
| 4,051,616 A | 10/1977 | Mathauser | |
| 4,650,161 A | 3/1987 | Kaneko | |
| 4,982,612 A * | 1/1991 | Rittmann | 73/862.23 |
| 5,479,831 A | 1/1996 | Hirose | |
| 5,560,560 A | 10/1996 | Hirose | |
| 5,639,038 A | 6/1997 | Hirose | |
| 5,833,156 A | 11/1998 | Park et al. | |
| 6,086,549 A * | 7/2000 | Neese et al. | 600/587 |
| 6,591,222 B2 | 7/2003 | Stiner | |
| 6,658,783 B1 | 12/2003 | Yamanaka | |
| 7,318,295 B2 | 1/2008 | Pekin | |
| 7,559,499 B2 | 7/2009 | Nakagawa et al. | |
| 7,727,117 B2 * | 6/2010 | Feldman et al. | 482/8 |
| 7,779,573 B2 | 8/2010 | Pekin | |
| 7,779,704 B1 * | 8/2010 | Chu | 73/862.338 |
| 7,861,454 B2 | 1/2011 | Pekin | |
| 7,895,908 B2 * | 3/2011 | Fujiwara et al. | 73/862.627 |
| 8,033,045 B2 | 10/2011 | Pekin | |
| 2010/0000143 A1 | 1/2010 | Pekin | |
| 2012/0085017 A1 | 4/2012 | Pekin | |

OTHER PUBLICATIONS

PTO Office Action, mailed Oct. 22, 2012, regarding U.S. Appl. No. 12/559,700.

* cited by examiner

*Primary Examiner* — Max Noori
(74) *Attorney, Agent, or Firm* — Larry K. Roberts

(57) ABSTRACT

Exemplary embodiments of force measurement systems are disclosed. In one embodiment, the force measurement system is implemented in a fishing rod system, to measure tension applied to the fishing line. Other exemplary embodiments include a fishing gaff used to gaff fish, and with a measurement system for providing an indication of the weight of a gaffed fish. Yet another embodiment is implemented in a fishing net, with a measurement system for providing an indicated of the weight of a netted fish or other netted object. A still further application for the force measurement system is in a shaft tension coupler.

31 Claims, 11 Drawing Sheets

FORCE MEASUREMENT SYSTEM

CROSS-REFERENCE TO RELATED APPLICATIONS

This application claims the benefit of U.S. Provisional Application No. 61/292,104, filed Jan. 4, 2010; is a continuation-in-part of U.S. application Ser. No. 12/559,700 filed Sep. 15, 2009; in turn a continuation-in-part of U.S. application Ser. No. 12/052,733 filed Mar. 21, 2008, now U.S. Pat. No. 7,861,454; in turn a continuation-in-part of U.S. application Ser. No. 11/977,714, filed Oct. 24, 2007, now U.S. Pat. No. 7,779,573; in turn a continuation-in-part of U.S. application Ser. No. 11/307,840, filed Feb. 24, 2006, now U.S. Pat. 7,318,295, the entire contents of which applications are hereby incorporated by reference.

BACKGROUND

The subject matter has application to fishing and more particularly to the design of fishing rods and reels and electronic fishing equipment, as well as to other applications involving measurements of force.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
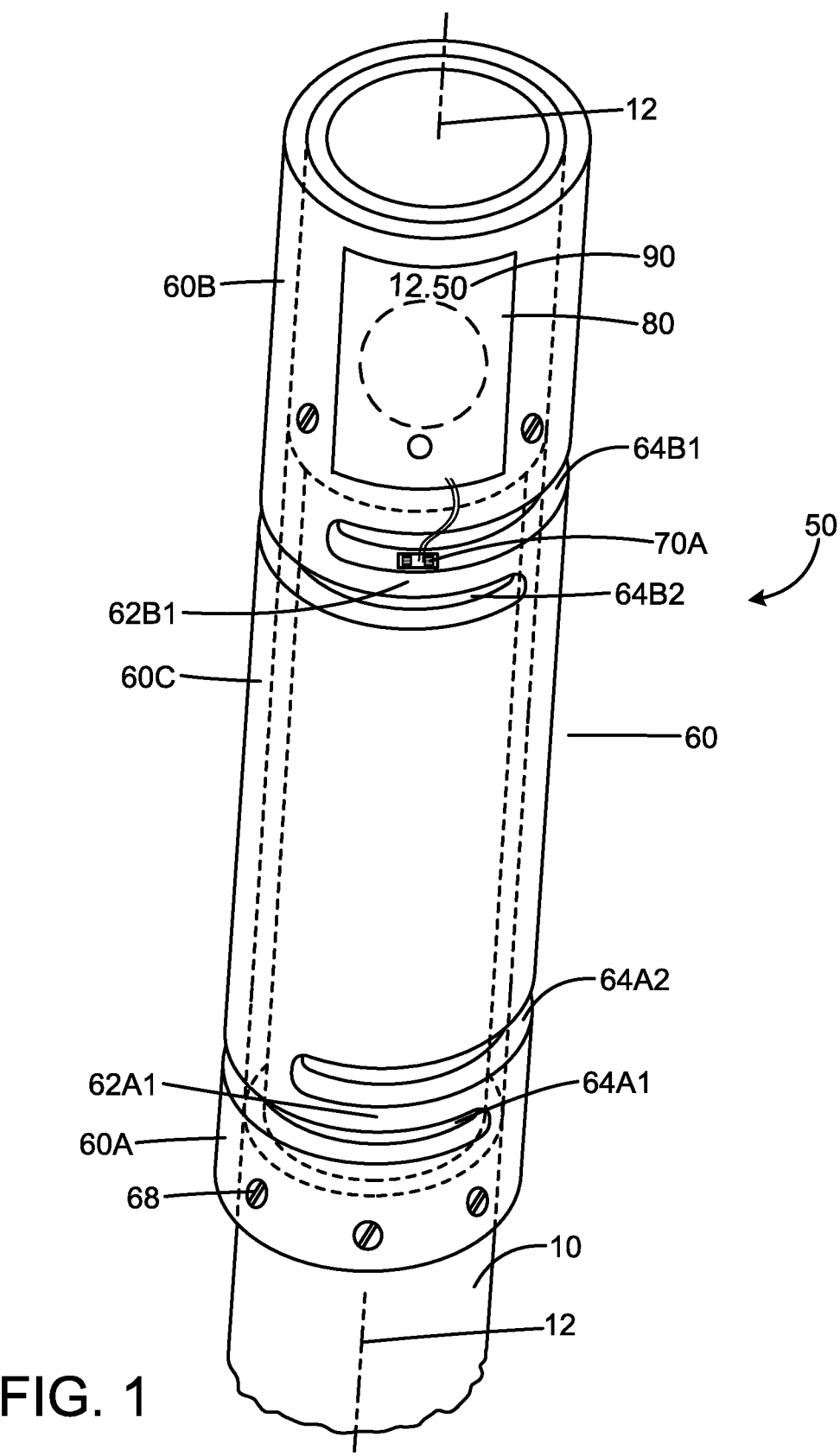
FIG. 1 illustrates an exemplary embodiment of a tension measurement system.

In the following detailed description and in the several figures of the drawing, like elements are identified with like reference numerals. The figures are not to scale, and relative feature sizes may be exaggerated for illustrative purposes.

Exemplary embodiments of force measurement systems are disclosed. In one embodiment, the force measurement system is implemented in a fishing rod system, to measure tension applied to the fishing line. Other exemplary embodiments include a fishing gaff used to gaff fish, and with a measurement system for providing an indication of the weight of a gaffed fish. Yet another embodiment is implemented in a fishing net, with a measurement system for providing an indicated of the weight of a netted fish or other netted object. A still further application for the force measurement system is in a shaft tension coupler.

FIG. 1 illustrates an exemplary embodiment of a tension measurement system 50. In this embodiment, the system includes an outer sleeve structure 60 mounted on a shaft member 10, with first and second opposed end portions 60A, 60B firmly attached to the shaft 10. The shaft has a longitudinal axis 12. The outer sleeve structure 60 further includes a center or intermediate portion 60C which is supported at each end by respective beams 62A1, 62A2 and 62B1, 62B2 (FIG. 4) defined in the sleeve structure by opposing slots 62A1, 64A2 and 64B1, 64B2. In an exemplary embodiment, the sleeve structure may be fabricated as an integral one-piece structure, e.g. made of metal or other rigid material. Suitable metal materials for the sleeve structure and the shaft include aluminum and steel. The slots may be formed in the sleeve structure by overlapping cuts formed in the sleeve structure, although other construction techniques may alternately be employed.

In an exemplary embodiment, the outer diameter of the shaft member 10 may be reduced under the center portion 60C, so that the center portion has no contact with the shaft 10. Exemplary dimensions for the reduction in diameter of the shaft member can vary significantly depending on the embodiment. A clearance of 0.020-0.030 inch or more is readily maintained, but could be more in some embodiments. The primary criteria is that there be no contact between the center portion of the sleeve and the shaft, so that all force on the center portion is captured in the beams. In other embodiments, the sleeve structure may have an enlarged inner diameter relative to the shaft outer diameter, with the end portions secured to the shaft by spacers or standoffs, thereby creating space between the center portion 60C and the shaft. The end portions of the sleeve member may be attached to the shaft by fasteners 68, by adhesive, or other suitable means. Thus the center portion 60C is floating above the shaft and supported only by the beams 62A1, 62A2, 62B1, 62B2.

In an exemplary embodiment, dual element strain gages 70A and 70B (FIG. 4) are mounted on the beams 62B1 and 62B2, and wired to an electronic control unit 80, and provide electrical output signals indicative of flexing of, or strain within, the respective beams to which the gages are attached. The electronic control unit 80 converts the output from the strain gages into a corresponding force using a Wheatstone bridge circuit. The electronic control unit 80 may include or drive a display unit 90, which provides an alphanumeric or numeric indication of the force calculated by the electronic control unit.

Figure 2:
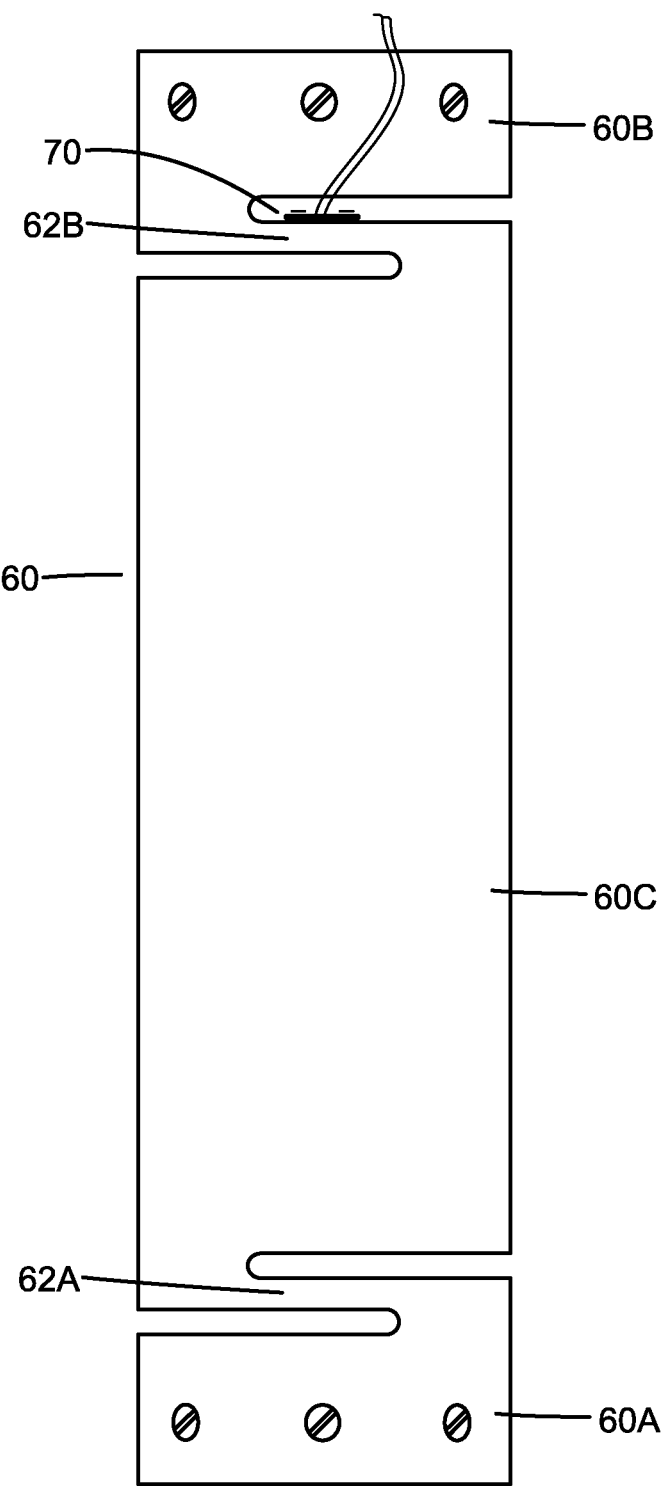
FIG. 2 is a front elevation view of an exemplary embodiment of a sleeve structure or portion thereof for a force measurement system as in FIG. 1.

FIG. 2 is a front elevation view of an exemplary embodiment of a sleeve structure 60 or portion thereof. In this exemplary embodiment, the sleeve structure is fabricated as a hollow tube, and the slots 64A1, 64A2, 64B1, 64B2 have been cut into the tube, leaving the center portion 60C connected to the end portions 60A, 60B by beams 62A1, 62A2, 62B1, 62B2. The beams have generally flat planar portions, to which the strain gauges are affixed, which are generally transverse to the longitudinal axis of the sleeve structure.

Figure 3:
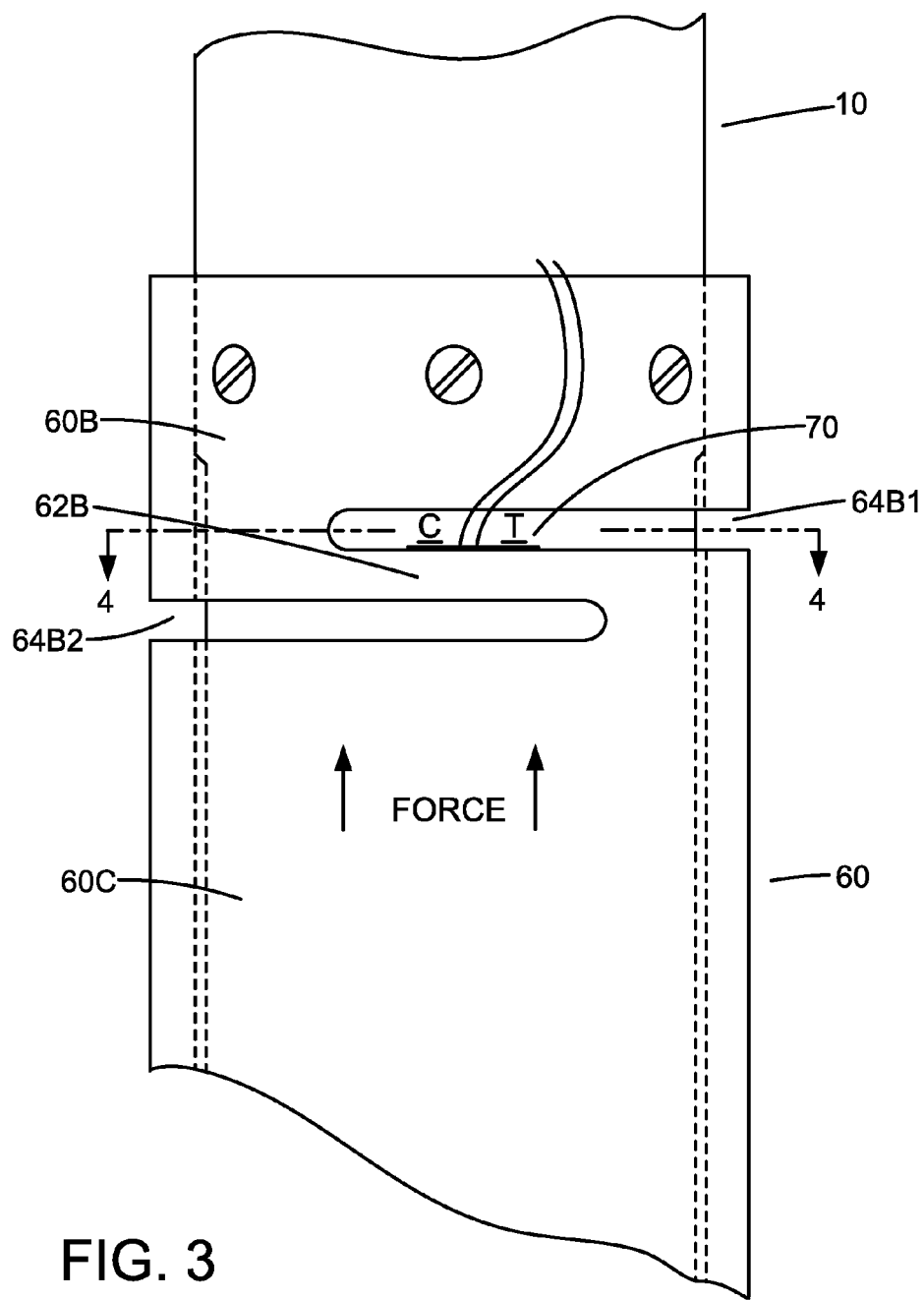
FIG. 3 is a detail partial front view of the measurement system of FIG. 1.

FIG. 3 is a detail partial front view of the measurement system, further illustrating how force on the center portion 60C induces stress in the supporting beams 62B1, 62B2. The beams will have both compression (C) and tension (T) strain as the center section 60C, which "floats" relative to the shaft 10, is pushed toward the end portion 60B, which is fixed relative to the shaft 10. The actual movement of the beams will typically be quite small, and in most applications imperceptible to the human eye.

Figure 4:
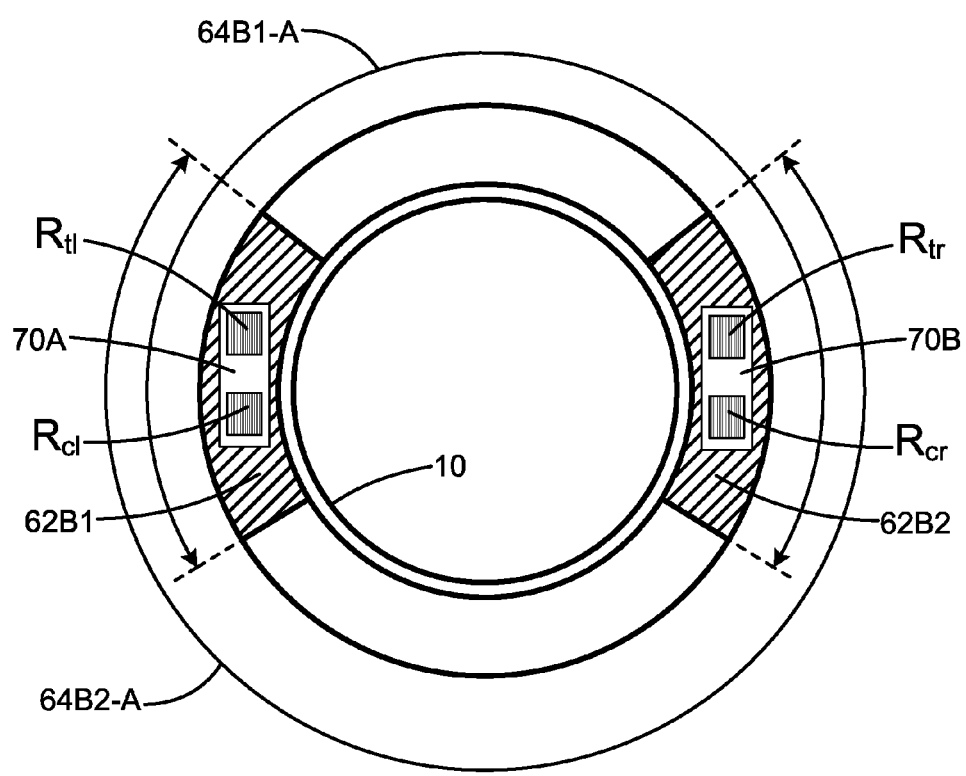
FIG. 4 is a cutaway end view of an exemplary embodiment of a force measurement unit, taken along line 4-4 of FIG. 3.

FIG. 4 is a cutaway end view of the measurement unit, taken along line 4-4 of FIG. 3, further illustrating an exemplary embodiment of the support beams 62A1, 62A2, 62B1, 62B2 and the strain gages 70A, 70B. The shaded regions represent the beams. Each beam has a radial extent of 60 degrees in this embodiment, with the beam 70A extending between 240 and 300 degrees, and beam 70B extending between 60 and 120 degrees. To form the beams, the upper slot 64B1 extends through a radial extent or cut angle of 240 degrees, between 240 and 120 degrees, and the lower slot 64B2 also has a radial cut angle of 240 degrees, extending between 60 and 300 degrees.

The stiffness of the beams may be selected to provide the appropriate strain range for the gages, and can be selected based on the requirements of the particular application. The stiffness can be varied by varying the slot radial extent, the beam length and the thickness of the beam in the longitudinal direction. Also the material of the sleeve structure will affect the beam stiffness. In an exemplary embodiment, the back beams 62A1, 62A2 may be "softer" i.e. more flexible than the beams 62B1, 62B2 to which the strain gauges are attached. This softness of the back beams results in additional force being applied to the beams to which the strain gauges are attached, thus improving the robustness of the measurement.

While the embodiment of FIG. 1 has two sets of beams, i.e. one set on each side of the center portion of the sleeve structure, with each end of the sleeve structure being affixed to the shaft, in other embodiment, the second set of beams may be omitted. In this case, one end of the sleeve structure is not affixed to the shaft, so that the center portion still floats relative to the shaft. This modification would not provide as much stability and rigidity as the embodiment of FIG. 1, but may still be serviceable for some applications.

Figure 5:
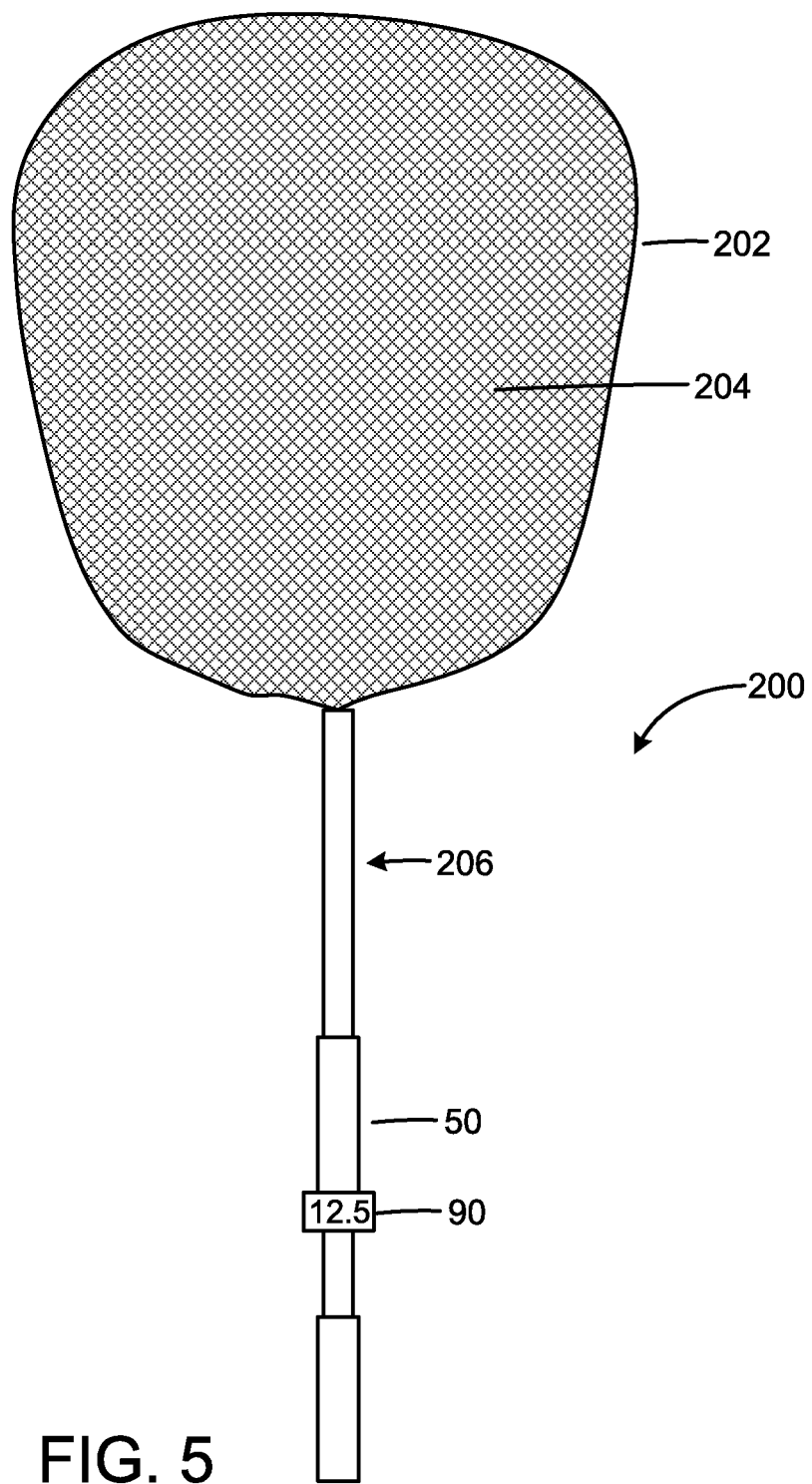
FIG. 5 shows an exemplary embodiment of a force measurement unit mounted on the shaft of a net.

FIG. 5 shows the measurement unit mounted on the shaft of a net 200. This will measure the weight of whatever is in the net. The net in this embodiment includes a net outer support rim 202, the netting 204 attached to the support rim, and a handle 206. The force measurement system 50 is positioned on the handle, wherein the sleeve structure of the system 50 is attached to the handle as the inner shaft structure. In use, the center portion of the sleeve structure is gripped by the user, and the handle pointed downwardly so that the netting dangles vertically from the handle. The weight of the netting and fish or other item in the netting will create a force which is measured by the system 50, converted to a weight measure such as pounds or kilograms, and displayed on the display 90.

Figure 6:
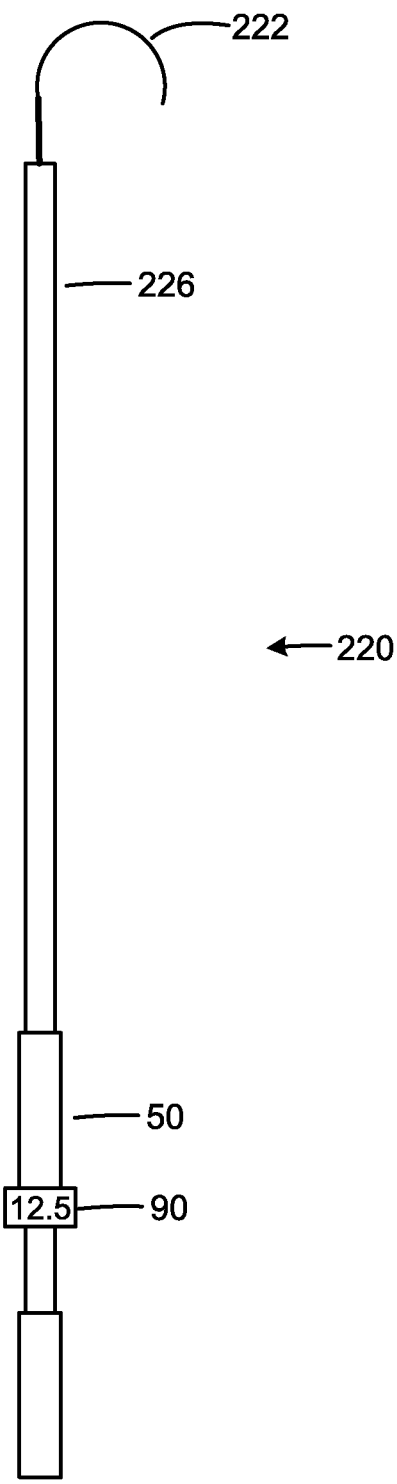
FIG. 6 shows an exemplary embodiment of a force measurement unit mounted on the shaft of a gaff.

FIG. 6 shows the measurement unit mounted on the shaft of a gaff 220. This will measure the weight of whatever is hooked by the gaff, such as a fish. The net in this embodiment includes a gaff hook 222 attached to a handle 226. The force measurement system 50 is positioned on the handle, wherein the sleeve structure of the system 50 is attached to the handle as the inner shaft structure. In use, the center portion of the sleeve structure is gripped by the user, and the handle pointed downwardly so that the gaff hook dangles vertically from the handle. The weight of the gaff and fish or other item on the gaff hook will create a force which is measured by the system 50, converted to a weight measure such as pounds or kilograms, and displayed on the display 90.

Figure 7:
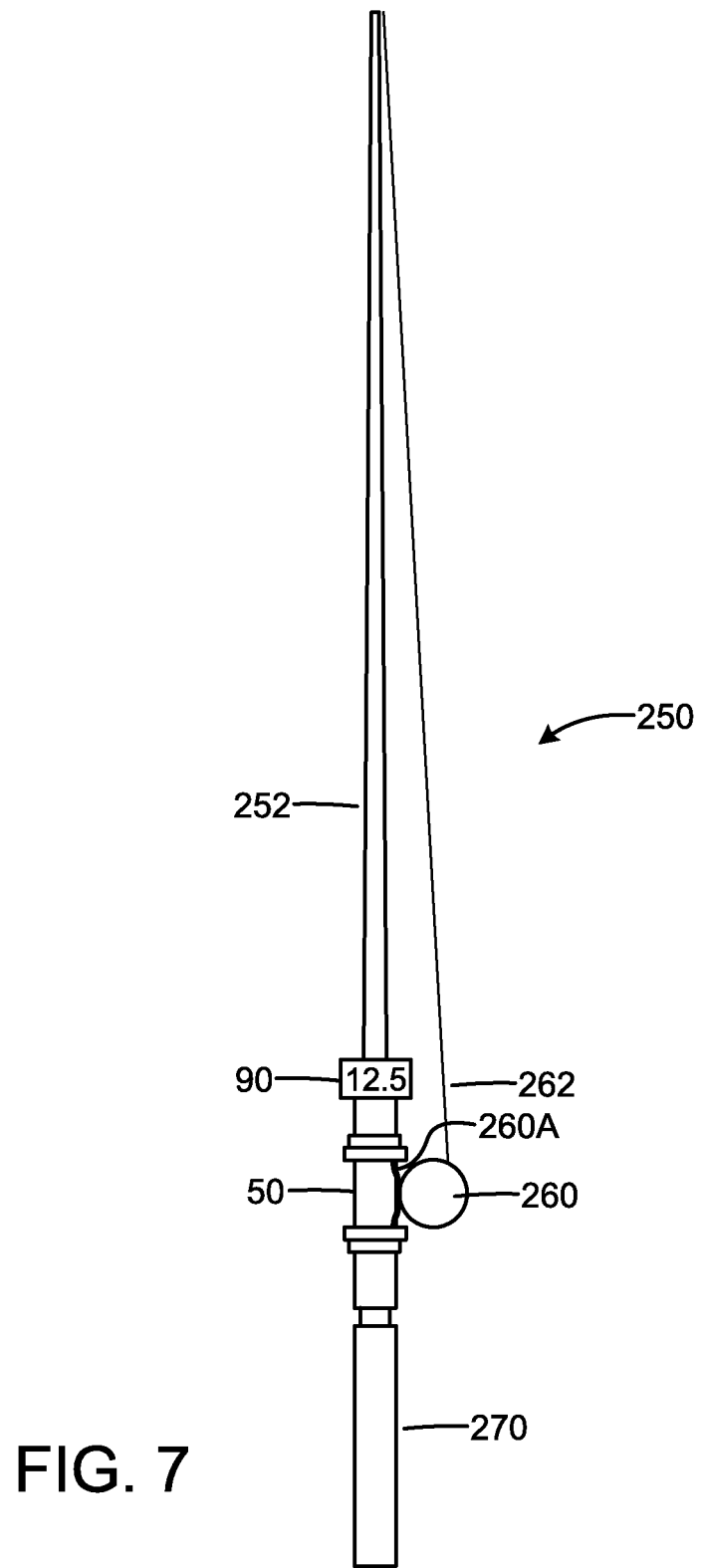
FIG. 7 shows an exemplary embodiment of a force measurement unit integrated into a reel seat on a fishing rod.

FIG. 7 shows an exemplary embodiment of a force measurement unit 50 integrated into a reel seat on a fishing rod 250. This will measure the force exerted by the pull of the line 262 from the fishing reel 260. FIG. 1 diagrammatically illustrates a fishing reel 10 and reel mount 12 for attaching the reel to a rod handle 18 of a fishing rod 16. The reel holds a supply of line 262, passed through the line guides (not shown in FIG. 7) of the rod to a fishing lure or hook (not shown). In an exemplary embodiment, the rod handle is implemented with a line tension measurement system 50, and the reel seat which may be implemented, for example, using sliding rings and nuts to secure the reel foot 260A onto the center portion of the sleeve structure. This type of reel seat is conventional; other types of reel seats may alternatively be employed. In operation, the fisherperson may hold the rod handle 270 by one or both hands, or one hand on the handle and one hand on the rod 252 above the center portion of the force measurement system. The force exerted on the reel by the line will result in strain applied to the beams of the sleeve structure, and the force measured and a corresponding value displayed on the display 90 of the force measurement system. In an exemplary embodiment, the strain gauges are mounted on the respective beams at 3 o'clock and 9 o'clock, respectively, with the reel mounted at 12 o'clock.

Figure 8:
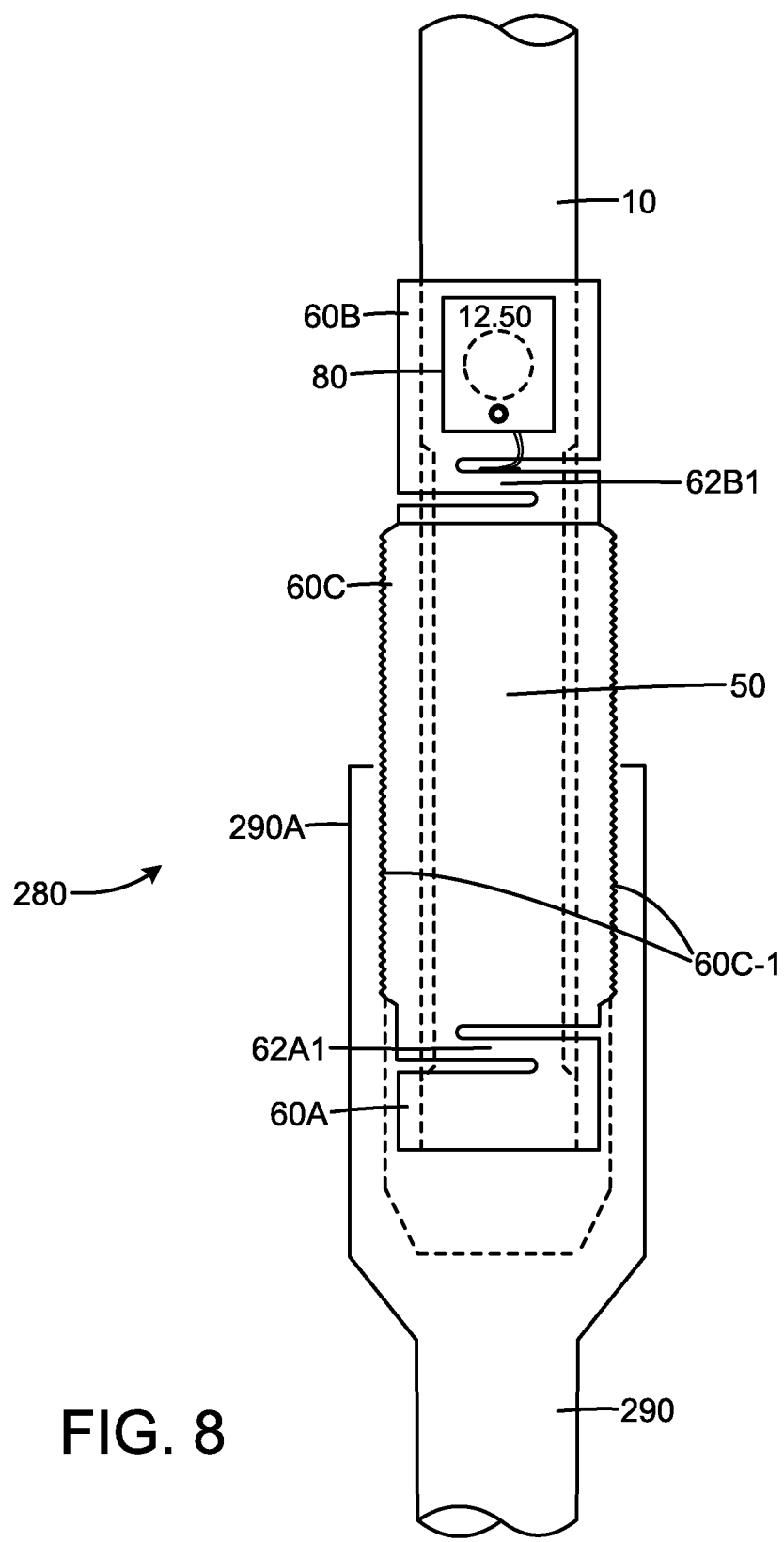
FIG. 8 shows an exemplary embodiment of a force measurement unit integrated into a shaft tension coupler.

FIG. 8 shows the measurement unit integrated into a shaft tension coupler 280. In this case, the measurement unit 50 is attached adjacent to or at the end of shaft 10. The outer diameter of the center portion 60C is threaded 60C-1) so that another shaft 290 can be attached by threading engagement with a socket end 290A. Once shaft 290 is threaded onto the center portion 60C of the force measurement system, all axial loads are supported by the sleeve structure beams, including beams 62B1 and 62A1, and measured by the electronic control unit 80.

Figure 9:
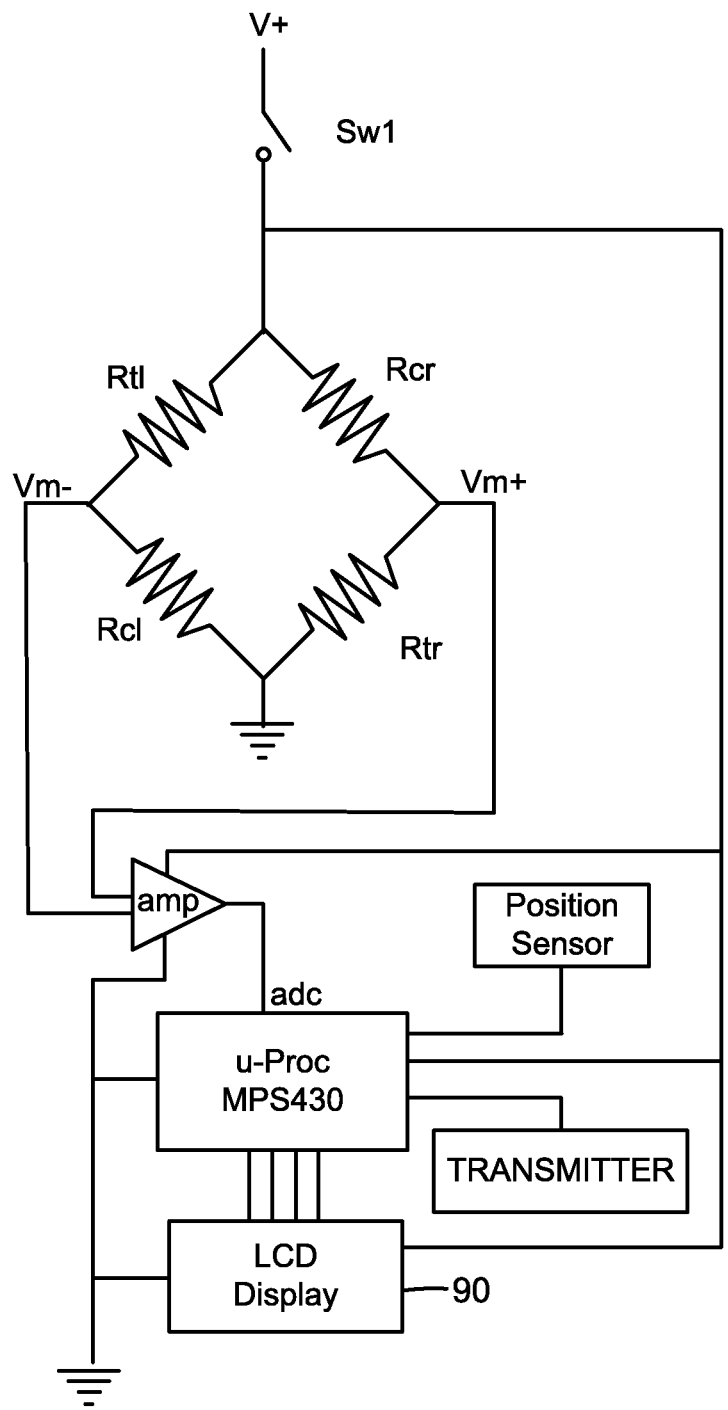
FIG. 9 is a simplified circuit schematic diagram of features of an exemplary electronic control system for a force measurement system.

FIG. 9 is a circuit diagram showing functional components of an exemplary embodiment of the electronic control system 80 of the force tension measurement system 50. The system includes a "full" Wheatstone bridge, i.e. each of the four legs of the bridge is a resistor from a mounted strain gage. In this exemplary embodiment, the strain gage on each flexing beam 62B1 and 62B2 (FIG. 4) is a dual gage, i.e. it actually has two gauges (resistors) on a single backing (see FIG. 4). Thus, the two flexing beams on which a strain gauge is mounted, as in the embodiment illustrated in FIG. 4, for example, contain all four resistors of the Wheatstone bridge. A full bridge is much less susceptible to thermal drift than a half bridge. This particular implementation has the gage resistors from the left double gage (Rtl & Rcl) (Rtl=Resistor Tension Left, Rcl=Resistor Compression Left) configured on one side of the bridge and the right double gage resistors (Rtr & Rcr) configured on the other side of the bridge. By balancing the right and left double gage across the Wheatstone bridge as shown, the thermal effects common with strain gauge implementations are mitigated. In this embodiment, the right and left side of the sleeve structure may heat independently. Since the double gage resistors are distributed evenly on each side of the Wheatstone bridge, this asymmetrical heating does not significantly affect the bridge output (Vm− and Vm+). The bridge output, which varies in response to the strain in the flexing beams, is amplified and measured by the analog to digital converter (ADC) in the micro-processor, a Texas Instruments MSP430 in this embodiment. The ADC reading is converted to a force in the micro-processor using a pre-programmed calibration, e.g. in values stored in a look-up table. Position compensation may be applied with input from position sensors, as described more fully in co-pending application Ser. No. 12/559,700. The calculated force is then displayed on the LCD display 90 and may optionally be transmitted by a transmitter to a remote receiver, unit, typically located remotely relative to the system 50. The receiver unit may provide signals indicative of the force measurement and processor output signals to a utilization device, e.g. a PDA, a fish finder, a data recorder/processor or remote display. Suitable transmitter technologies include, but are not limited to, radio frequency (RF), infrared (IR), audible, or simple electrical signals through hard wiring. Power to the circuit may be supplied by a battery. The switch Sw 1 allows the user to turn the force measurement system on/off, in one exemplary embodiment.

Figure 10:
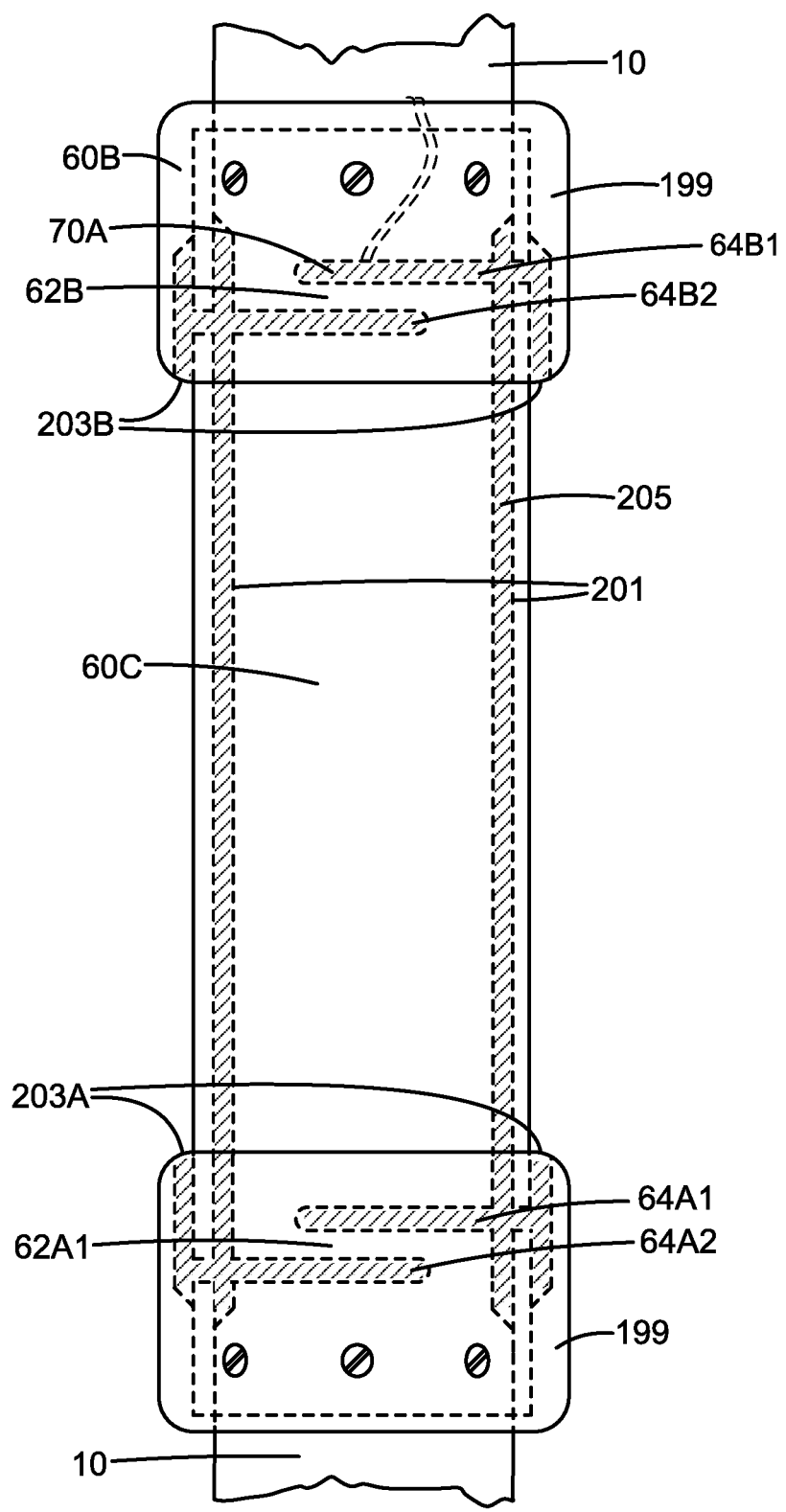
FIG. 10 shows an exemplary embodiment of a force measurement unit fitted with hoods for protection from the elements.

FIG. 10 shows an exemplary embodiment of the force measurement unit 50 fitted with protective hoods 199 over the beam elements. The hoods are designed to protect the measurement unit without disturbing the measurement. As such, they are attached to the measurement unit to the shaft 10 and the fixed end portions 60A, 60B of the sleeve 60, and have enlarged diameters, e.g. at 203 so that there is no contact between the floating center portion 60C of the sleeve. The hoods 199 may be fabricated of a rigid material such as metal or rigid plastic.

To further protect the measurement unit from the environment, all of the voids or interstices between the beams (64A1, 64A2, 64B1, 64B2), the void 201 between the shaft 10 and the center portion 60C of the sleeve 60, and the voids 203A and 203B between the hoods and the shaft, are filled with a water proof encapsulant, for example Gella 4441. Some of the voids are illustrated in FIG. 10 by cross-hatching. This encapsulant seals the beams 62A1 and 62B1 and strain gages 70A, 70B to make the force measurement unit suitable for a harsh environment, such as a marine environment. The fill material is preferably very compliant in order to not significantly impede the relative motion between the center portion 60C of the sleeve 60 and the shaft 10. Gella 4441 is a material that is soft and gelatinous and provides the environmental protection yet does not appreciably limit the motion between the center portion 60C of the sleeve 60 and the shaft 10. The electronic control system 80 may be similarly protected with an encapsulant.

Figure 11:
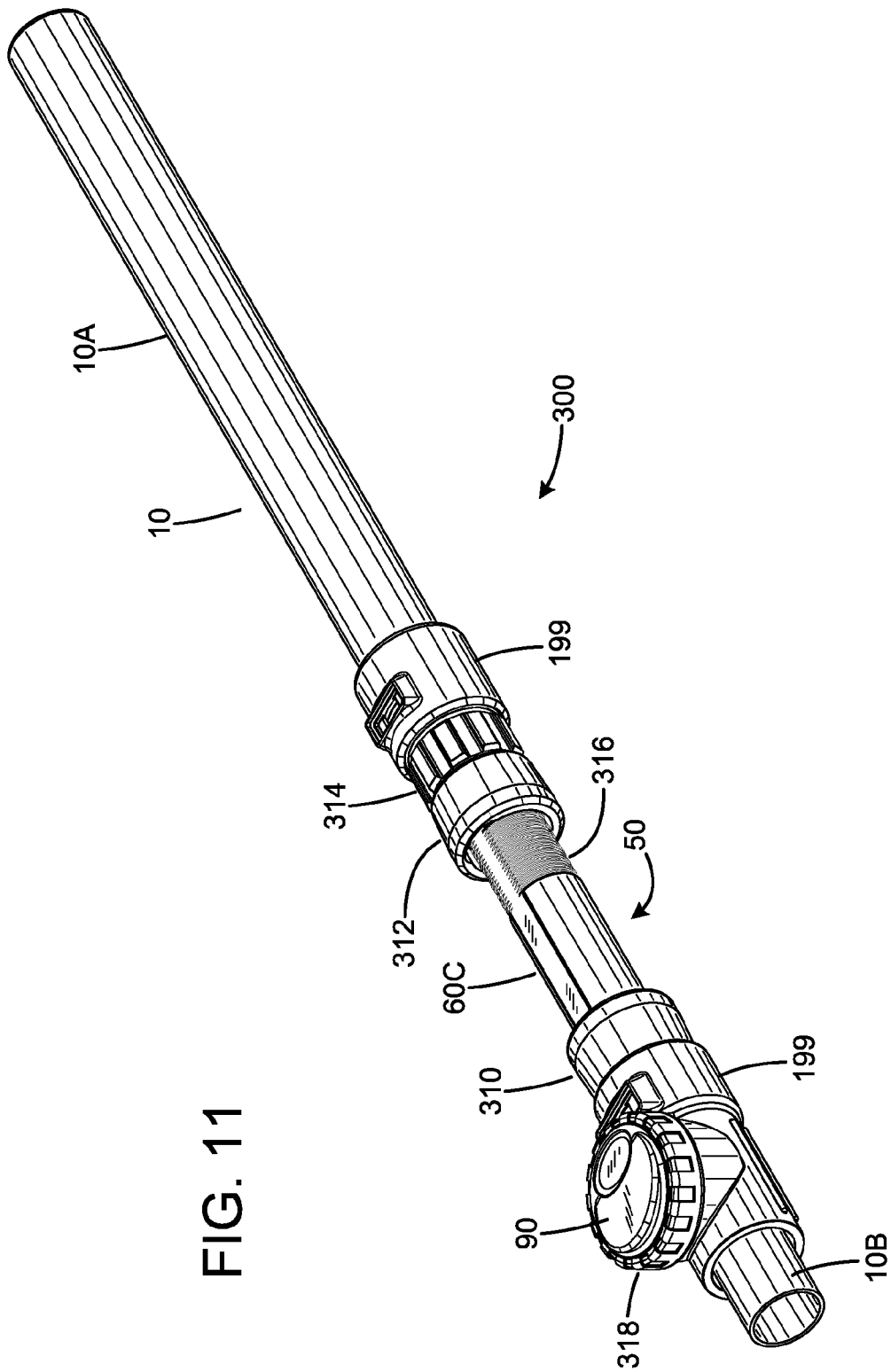
FIG. 11 shows another exemplary embodiment of a force measurement system integrated into a fishing rod handle structure.

FIG. 11 depicts an exemplary embodiment of a handle section 300 with an integrated force measurement system 50, particularly configured for assembly to a fishing rod section. The force measurement system include a sleeve structure as in the embodiment of FIG. 1, wherein the intermediate portion 60C is configured to "float" relative to the shaft 10. The portion 60C has fitted onto its outer periphery a fixed reel hood section 310 and a movable reel hood section 312, with a knurled and threaded nut member 314 mounted for threaded engagement with threaded portion 316 of the intermediate portion 60C. Thus the fixed hood section is attached to the sleeve portion 60C, while the movable hood section 312 may slide along the intermediate portion along a range of motion. The ends of the foot of a reel are received in recesses in the reel hoods, and the nut 314 can be turned on the threads to tighten against the reel foot to secure the reel to the rod handle. Thus, in this embodiment, a reel secured to the floating portion 60C will exert a force on the portion 60C as line on the reel is pulled by a fish, a trolling pressure or the like. The handle section 300 also includes the hoods 199 as described above regarding the embodiment of FIG. 10, housing structure portion 318 which houses the electronic control system and the display 90. The housing structure portion 318 may also house a battery for providing the power source for the electronic control system. The handle section 300 may be attached to a fishing rod, inserted into the open end of the shaft section 10B. The opposite end portion 10A of the shaft 10 may be covered with a handle material, e.g. an elastomeric coating.

Although the foregoing has been a description and illustration of specific embodiments of the subject matter, various modifications and changes thereto can be made by persons skilled in the art without departing from the scope and spirit of the invention.

What is claimed is:

1. A force measurement system, comprising:
   (a) an elongated shaft member having a longitudinal extent;
   (b) an outer sleeve having a first end portion, a second end portion, and an intermediate portion, said first end portion attached to said shaft member, and said intermediate portion is allowed limited longitudinal motion with respect to said shaft member;
   (c) a force measurement device configured, when in operational mode, to produce a response indicative of an externally generated force applied to the intermediate portion, wherein the force measurement device generates a response indicative of a force applied in a substantially longitudinal direction of said shaft member, and wherein said response will vary over a range extending from a first response level indicative of a lower externally generated force to a second response level indicative of a higher externally generated force, and including a plurality of intermediate response levels between the first response level and the second response level; and
   (d) wherein said force measurement device comprises a sensor configured to continuously produce a response, in operational mode, indicative of said externally generated force based on a movement of or a strain induced in said intermediate portion of said sleeve with respect to said shaft member.

2. The system of claim 1, further comprising:
   a visual display configured, when in operational mode, to display a value based on said response of said force measurement device indicative of said externally generated force.

3. The system of claim 1, wherein said intermediate portion is connected to said first end portion by a beam portion, and said force measurement device measures a flexing of, or strain within, said beam portion in response to said force.

4. The system of claim 3, wherein said force measurement device comprises one or more strain gauges attached to said beam structure.

5. The system of claim 3, wherein the beam structure is integrated with said first end portion and said intermediate portion.

6. The system of claim 3, wherein said second end portion is attached to said shaft member, and said intermediate portion is connected to said second end portion by a second beam portion.

7. The system of claim 6, wherein the second beam structure is integrated with said intermediate portion.

8. The system of claim 3, wherein the beam structure is a thin rigid portion with capability to deflect or flex in response to said force.

9. The system of claim 3, further comprising a protective hood structure attached to the shaft or the first end portion, and extending over the beam structure without contacting the beam structure or the intermediate portion.

10. The system of claim 9, further comprising an elastic encapsulant material filling interstices between the beam structure and the first end portion and the intermediate portion.

11. The system of claim 1, wherein the sleeve member is an integral structure.

12. The system of claim 1, wherein the shaft member and the sleeve member are separate structures.

13. A force measurement system, comprising:
(a) an elongated shaft member having a longitudinal extent;
(b) an outer sleeve having a first end portion, a second end portion, and an intermediate portion, said first end portion attached to said shaft member, and said intermediate portion is allowed limited longitudinal motion with respect to said shaft member;
(c) a force measurement device configured, when in operational mode, to produce a response indicative of an externally generated force applied to the intermediate portion, wherein the force measurement device generates a response indicative of a force applied in a substantially longitudinal direction of said shaft member, and wherein said response will vary over a range extending from a first response level indicative of a lower externally generated force to a second response level indicative of a higher externally generated force, and including a plurality of intermediate response levels between the first response level and the second response level; and
(d) wherein said force measurement device comprises a sensor configured to continuously produce a response, in operational mode, indicative of said externally generated force based on a movement of or a strain induced in said intermediate portion of said sleeve with respect to said shaft member; and
wherein the shaft member comprises a handle section of a fishing rod, a fishing reel is attached to the intermediate portion, and the force measurement system is configured to measure a fishing line tension.

14. A force measurement system, comprising:
(a) an elongated shaft member having a longitudinal extent;
(b) an outer sleeve having a first end portion, a second end portion, and an intermediate portion, said first end portion attached to said shaft member, and said intermediate portion is allowed limited longitudinal motion with respect to said shaft member;
(c) a force measurement device configured, when in operational mode, to produce a response indicative of an externally generated force applied to the intermediate portion, wherein the force measurement device generates a response indicative of a force applied in a substantially longitudinal direction of said shaft member, and wherein said response will vary over a range extending from a first response level indicative of a lower externally generated force to a second response level indicative of a higher externally generated force, and including a plurality of intermediate response levels between the first response level and the second response level; and
(d) wherein said force measurement device comprises a sensor configured to continuously produce a response, in operational mode, indicative of said externally generated force based on a movement of or a strain induced in said intermediate portion of said sleeve with respect to said shaft member; and
wherein the shaft member comprises a handle section of a fishing gaff, which further includes a hook member attached to the shaft member.

15. A force measurement system, comprising:
(a) an elongated shaft member having a longitudinal extent;
(b) an outer sleeve having a first end portion, a second end portion, and an intermediate portion, said first end portion attached to said shaft member, and said intermediate portion is allowed limited longitudinal motion with respect to said shaft member;
(c) a force measurement device configured, when in operational mode, to produce a response indicative of an externally generated force applied to the intermediate portion, wherein the force measurement device generates a response indicative of a force applied in a substantially longitudinal direction of said shaft member, and wherein said response will vary over a range extending from a first response level indicative of a lower externally generated force to a second response level indicative of a higher externally generated force, and including a plurality of intermediate response levels between the first response level and the second response level; and
(d) wherein said force measurement device comprises a sensor configured to continuously produce a response, in operational mode, indicative of said externally generated force based on a movement of or a strain induced in said intermediate portion of said sleeve with respect to said shaft member; and
wherein the shaft member comprises a handle section of a fishing net, which further includes a fishing net attached to the shaft member, and the force measurement system is configured for providing an indication of a weight of a fish held by the net.

16. A force measurement system, comprising:
(a) an elongated shaft member having a longitudinal extent;
(b) an outer sleeve having a first end portion, a second end portion, and an intermediate portion, said first end portion attached to said shaft member, and said intermediate portion is allowed limited longitudinal motion with respect to said shaft member;
(c) a force measurement device configured, when in operational mode, to produce a response indicative of an externally generated force applied to the intermediate portion, wherein the force measurement device generates a response indicative of a force applied in a substantially longitudinal direction of said shaft member, and wherein said response will vary over a range extending from a first response level indicative of a lower externally generated force to a second response level indicative of a higher externally generated force, and including a plurality of intermediate response levels between the first response level and the second response level; and
(d) wherein said force measurement device comprises a sensor configured to continuously produce a response, in operational mode, indicative of said externally generated force based on a movement of or a strain induced in said intermediate portion of said sleeve with respect to said shaft member; and
wherein the intermediate portion has a threaded outer peripheral region, configured for engagement with a socket end of a second shaft structure, and the force measurement system is configured for providing an indication of a force applied to said second shaft along said longitudinal extent.

17. The system of claim 1, further comprising an electronic controller system responsive to the sensor system and a transmitter coupled to the controller system for transmitting signals indicative of said response.

18. A force measurement system, comprising:
an elongated shaft member having a longitudinal extent;
a outer sleeve having a first end portion, a second end portion, and an intermediate portion, said first end portion attached to said shaft member, said second end portion attached to said shaft member, said intermediate portion connected to said first end portion by a first beam structure, said intermediate portion connected to said second end portion by a second beam structure;

a force measurement device configured, when in operational mode, to produce a response indicative of an externally generated force applied to the intermediate portion applied in a substantially longitudinal direction of said shaft member; and wherein said force measurement device comprises a sensor system configured to produce a response, in operational mode, indicative of said externally generated force based on a strain or flexing of at least one of said first and second beam structures in response to said force.

19. The system of claim 18, further comprising:

a visual display configured, when in operational mode, to display a value based on said response of said force measurement device indicative of said externally generated force.

20. The system of claim 18, wherein said sensor system comprises one or more strain gauges attached to said at least one of said first and second beam structures.

21. The system of claim 18, wherein said first beam structure is integrated with said first end portion and said intermediate portion, and said second beam structure is integrated with said second end portion.

22. The system of claim 18, wherein the first and second beam structures each comprise a thin rigid beam portion with capability to deflect or flex in response to said force.

23. The system of claim 22, wherein the first and second beams have generally flat planar portions which are generally transverse to the longitudinal axis of the sleeve structure.

24. The system of claim 22, wherein the first and second beam structures are each defined by a first slot and a second slot formed partially through the sleeve structure.

25. The system of claim 18, wherein the sleeve member is an integral structure.

26. The system of claim 18, wherein the shaft member comprises a handle section of a fishing rod, a fishing reel is attached to the intermediate portion, and the force measurement system is configured to measure a fishing line tension.

27. The system of claim 18, wherein the shaft member comprises a handle section of a fishing gaff, which further includes a hook member attached to the shaft member.

28. The system of claim 18, wherein the shaft member comprises a handle section of a fishing net, which further includes a fishing net attached to the shaft member, and the force measurement system is configured for providing an indication of a weight of a fish held by the net.

29. The system of claim 18, wherein the intermediate portion has a threaded outer peripheral region, configured for engagement with a socket end of a second shaft structure, and the force measurement system is configured for providing an indication of a force applied to said second shaft along said longitudinal extent.

30. The system of claim 18, further comprising first and second protective hood structures respectively attached to the shaft or the first end portion, and to the shaft or to the second end portion, and extending over the respective first and second beam structures without contacting the beam structures or the intermediate portion.

31. The system of claim 30, further comprising an elastic encapsulant material filling interstices between the first and second beam structure and the first and second end portions and the intermediate portion.

* * * * *